United States Patent Office 3,823,200
Patented July 9, 1974

---

3,823,200
ELECTRICAL INSULATION COMPOUND, PARTICULARLY FOR HIGH POWER, HIGH TENSION COILS TO BE USED IN ROTATING ELECTRICAL MACHINERY, AND INSULATION MATERIAL UTILIZING SAID COMPOSITION
Henri Vayson de Pradenne, Paris, and Serge Marcdargent, Bois Colombes, France, assignors to Societe Generale de Constructions Electriques et Mecaniques (Alsthom), Paris, France
Continuation of abandoned application Ser. No. 50,854, June 29, 1970. This application Aug. 4, 1972, Ser. No. 278,036
Int. Cl. C08g 45/08
U.S. Cl. 260—831
9 Claims

ABSTRACT OF THE DISCLOSURE

Electrical insulation sheets, tapes, formed units or the like can be made by impregnating mica flake sheets, asbestos sheet, glass fibers, or agglomerates thereof with particular binder insulation compositions. The compositions comprise a mixture of at least three of the following four components: (1) Epoxy-type resin of bisphenol A of epoxy equivalent between 174 and 195; (2) epoxy-type resin of novolac of epoxy equivalent between 175 and 182; (3) hardner, being a resorcinol-formaldehyde condensate obtained by the reaction of 2 mols of resorcinol and 1 mol of formaldehyde with an organic acid catalyst; and (4) a hardner, other than hardner (3), of phenol novolac resin prepared with an organic acid catalyst and having a chain structure of 5 to 8 links; the hardners being used with respect to the resins between 0.5 and 1.3 of the stoichiometric quantity, in other words with the resins corresponding to hydroxide/oxyrane ratios between 0.5 and 1.3, preferably 0.9.

---

This is a continuation of application Ser. No. 50,854, filed June 29, 1970, now abandoned.

The present invention relates to electrical insulation material, and more particularly to a family of resinous binders for electrical insulation which can be used as such, or can be used to impregnate electrical insulation tape, blocks, and the like; and to electrical machinery insulated by means of materials utilizing the electrical insulation and especially to rotating machinery subjected both to mechanical as well as to electrical stresses.

Rotating electrical machinery, and particularly high power electrical machinery usually utilizes windings formed of a plurality of individual conductors, overlapped with respect to each other and each separately insulated from each other by resins surrounding the individual conductors within the slot of the machine; separators, likewise impregnated with resin may be used to separate the conductors, as well as compensating and filling units to ensure symmetrical placement of the conductors. These units may likewise be impregnated with the resin, and/or with binder, or adhesive varnish, in order to obtain by molding of the conductor, and heating of the binder of the various insulating elements, a compact unit which is mechanically sturdy. The conductors of the windings, themselves, are insulated from the iron core of the magnetic circuit, that is from the mass, or ground, usually by taping by means of mica containing ribbons, or tapes, the mica itself being in flakes formed into an agglomerate by resinous binders which are dried under vacuum and under heat.

The resins utilized in the manufacture of a winding conductor, or winding unit, that is the internal insulation, should present a high degree of reactivity in order to reduce the molding time, and to provide good mechanical resistance as well as good heat resistance, in order to avoid deformation after their final treatment.

The resinous binders for the insulation tapes, that is to insulate the windings from the iron circuit are usually applied in the form of a varnish, or paint-like coating, that is as a solution of binders in a solvent. These varnishes, or paint-like solvents should have a viscosity which is so high that the mica-containing tapes are easily penetrated; they should, however, not set or harden during storage before use. They should, however, progressively condense in order to permit, not only drying under vacuum of the taped windings, but also effect hardening beyond, and outside of a heating oven.

The eventual characteristics required from the insulation vary considerably depending on the type of machinery which is to be constructed. Thus, for turboalternators of high powders which are directly cooled, mechanical properties are of prime consideration, to be acceptable to resist the high electrodynamic stresses placed thereon by the current per slot, and to conserve the intrinsic properties of the insulation during the life of the machine at a maximum temperature in the order of 120° C., which is the usual limit of operating temperature.

In case of hydraulic alternators, or of large synchronous motors, the smaller dimensions of the wires on the one hand, and the higher heat generation resulting therefrom require maintenance of mechanical as well as electrical properties of the insulation up to a temperature of 155° C., corresponding to the international temperature class F.

The various constructional elements on the one hand, for example internal insulation between conductors in a winding, and insulation from ground or mass, as well as the insulation of the type of the machine itself and the use and design of the machines presents different electrical and mechanical problems to the insulation designer, both with respect to mechanical resistance, heat capacity (resistance to deterioration under heat), dielectric properties, and condensation characteristics of the insulation compounds.

Preparation of the condensation compounds usually started from resins of different chemical families. This presents difficulties in stocking various base materials, as well as the risk of incompatibility between the various insulation compounds used on the same machine. One specific resin could not satisfactorily supply all the necessary requirements presented to the machine designer. This problem becomes more difficult to resolve as, gradually, the power of the machine increases and the operating voltages rise, requiring insulation materials both of dielectric, mechanical, as well as heat capacity properties which are more and more demanding.

It is accordingly an object of the present invention to provide an insulating compound which can be made from various components which can readily be stored, and which can be mixed together in such various and diverse manners to obtain different characteristics of the resulting compound.

*Subject matter of the present invention:* Briefly, a family of binders is provided which is formed of a mixture of three of at least the following four components:

(1) Epoxy-type resin of bisphenol A of epoxy equivalent between 174 and 195;
(2) epoxy-type resin of novolac of epoxy equivalent between 175 and 182;
(3) hardener, of phenol novolac type, prepared with an organic acid catalyst, having a chain structure of 5 to 8 links, i.e., methylene linkages; and
(4) hardener, in form of a resorcinol-formaldehyde condensate obtained by reaction of 2 molar proportions of resorcinol and 1 molar proportion of formaldehyde with an organic acid catalyst, the hardener being used with respect to the resins between about 0.5 and about 1.3 of the stoichiometric quantity, in other words with the resins corresponding to hydroxide/oxyrane ratios between about 0.5 and about 1.3, preferably 0.9.

Preferably, the resins and hardeners are used in a ratio of hydroxide/oxyrane of about 0.9.

The phenol-formaldehyde organic acid (or acids) condensation catalysts may equally be the reaction catalysts for the polymerization between the epoxy resin and hardener and the acid (or acids) in the resulting binder will, with respect to the resin, form between about 0.1 and about 6%, by weight, of the hardener, the quantity depending on the desired reactivity.

Suitable epoxy resins include:

bisphenol A
Epon 827 (made by Shell)
DER 332 (Dow Chemical)
My 745 (Ciba).
Novolac-type epoxy resin include:
Epon 154 (Shell)
DEN 438 (Dow Chemical)
EPN 1138 (Ciba).

The invention will be described by way of example with reference to the accompanying drawings, wherein.

Figure 3:
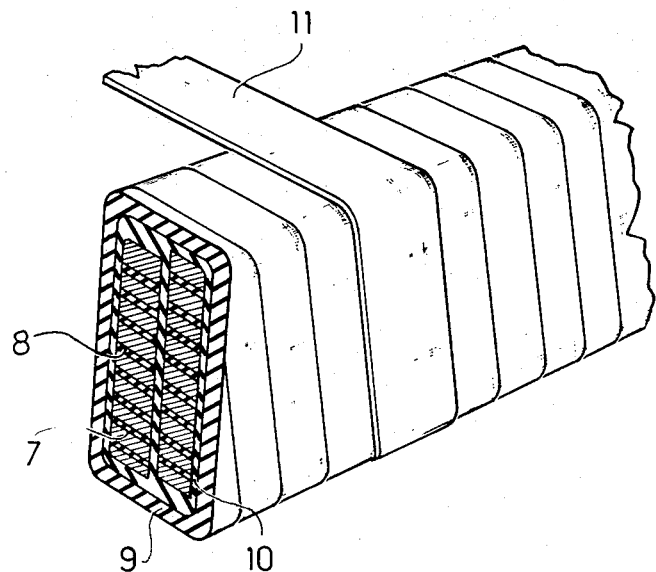
FIG. 3 is a schematic cross-sectional view of a completed conductor unit, for placement in the slot of an electrical machine, illustrating various types of insulation.

Referring first to FIG. 3: A group of elementary overlapped conductors 7 are separated from each other by asbestos, or asbestos boards or sheets 8, the sheets or boards 8 separating the various individual conductors from each other. The separators 8 may have glass fibers, or the like embedded therein, or the asbestos may be fibrous. Crossings, during transpositions, are insulated from each other by means of small sheets, not shown, of agglomerated, impregnated mica. The corners of the winding unit are formed by corner elements 9, of asbestos sheet, saturated with binder. Surrounding covers 10, formed for example of resin, mold around the conductor unit to provide symmetrical placement. A tape 11, for example about 3 cm. wide is wrapped around the conductor unit, the tape itself being saturated in resin. Sufficient layers of the tape are placed about the conductor element in order to obtain the final desired design thickness, for example 5.5 mm. for 24 kv. of nominal tension.

The method of manufacture, and the resins to be used will now be explained.

Figure 1:
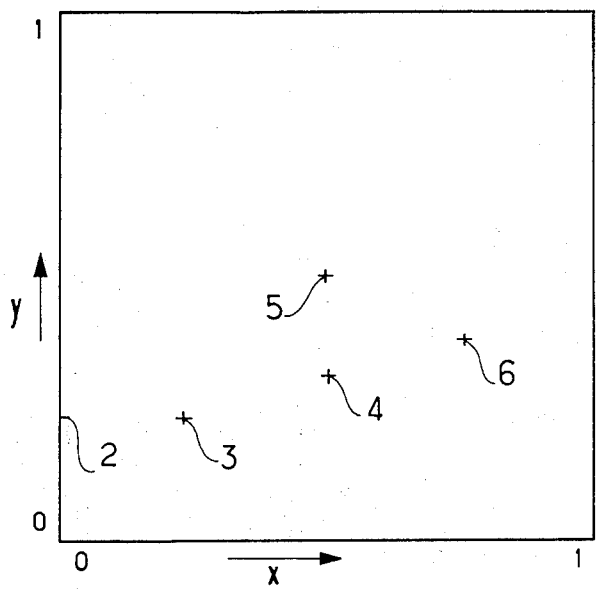
FIG. 1 is a square diagram representing, in the abscissa, the relationship between the epoxy equivalent and the total epoxy in the binder and, in the ordinate, the relationship between the equivalent hydroxyl phenol and the total equivalent hydroxyl in the binder.

Referring to FIG. 1: A point of the diagram defines at the abscissa the proportion of the two epoxy resins which are used, and on the ordinate the proportion of the two novolac hardeners which are used. A binder having the four constituents, will then be represented by any one point within the interior of the square of FIG. 1. At the limits, that is if the binder merely contains three components and not four one of the sides of the square will be indicated.

In accordance with the invention, the family of binders all should have excellent dielectrical properties which can be modified with respect to other properties by displacing the proportions within the interior of the diagram of FIG. 1. Thus, the particular characteristics of the binders can be adapted to required design characteristics of the various insulation materials required by electrical machinery, as well as to manufacturing conditions, application of the insulation and final manufacturing steps, in accordance with the function the material will have to fulfill in the electrical machinery in which it is finally installed. One can, therefore, satisfy severe working requirements imposed on the insulation of modern high-power, high-speed electrical machinery while still working with insulation material of homogeneous chemical nature requiring stocking of only a limited number of components which are easily stored.

The manufacture of insulation against ground of high-tension equipment, satisfying temperature conditions for international class F (155° C.), having dielectric losses defined by a tangent of the loss angle less than 10% at 160° C.

The figure illustrates a number of points representative of insulation compounds. Table I identifies a group of points giving their $x$ and $y$ coordinates, as well as the tagent of the loss angle measured at 160° C.:

TABLE I

| Points | 1 | 2 | 3 | 4 | 5 |
| --- | --- | --- | --- | --- | --- |
| $x$ | 0 | 0.25 | 0.50 | 0.50 | 0.75 |
| $y$ | 0.25 | 0.25 | 0.32 | 0.50 | 0.40 |
| Tan $\delta$ at 160° C | 0.026 | 0.029 | 0.028 | 0.025 | 0.028 |

The binder composition can be arranged to fit the design requirements of the insulation by varying the components keeping in mind these considerations: The type of epoxy resin selected will have an effect. A mixture rich in novolac epoxy resin, for example of the type DEN 438 provides a binder which has excellent aging characteristics, even at high temperatures, but having reduced mechanical flexibility at ambient temperature. The softening temperature, and the liquification temperature before oven heating diminishes with the proportion of novolac-type epoxy resin. The residual ratio of solvent in the insulation material can thereby be reduced shortly before use. Additionally, the mechanical deformation temperature, during heating, and measured by the deflection under load (degrees Martens) increasing with the proportion of novolac-type epoxy resin.

There is a difference of the heat-deformation temperature between a composition uniquely containing a bisphenol epoxy-type resin on the one hand, and a composition which contains only novolac-type resins, even if both resins are hardened by the same hardening mixture. The hardening mixture is used with the same equivalent ratio between the number of oxyrane cycles of the epoxy-type resin components of the mixtures and the hydroxyl present in the novolac portion. This temperature difference of deformation under heat is approximately 25° C.

A second difference results from the choice of the respective ratio of the hardeners, namely phenol novolac and resorcinol condensate. Increasing the resorcinol condensate results in a considerable increase of the Martens deformation temperature, this difference being in the order of approximately 65° C. between a mixture of epoxy resins hardened by phenol novolac alone and the same mixture hardened by a resorcinol condensate, taken alone. As a condition, the same equivalent ratio between the reactive groups of the two components has been used.

Figure 2:
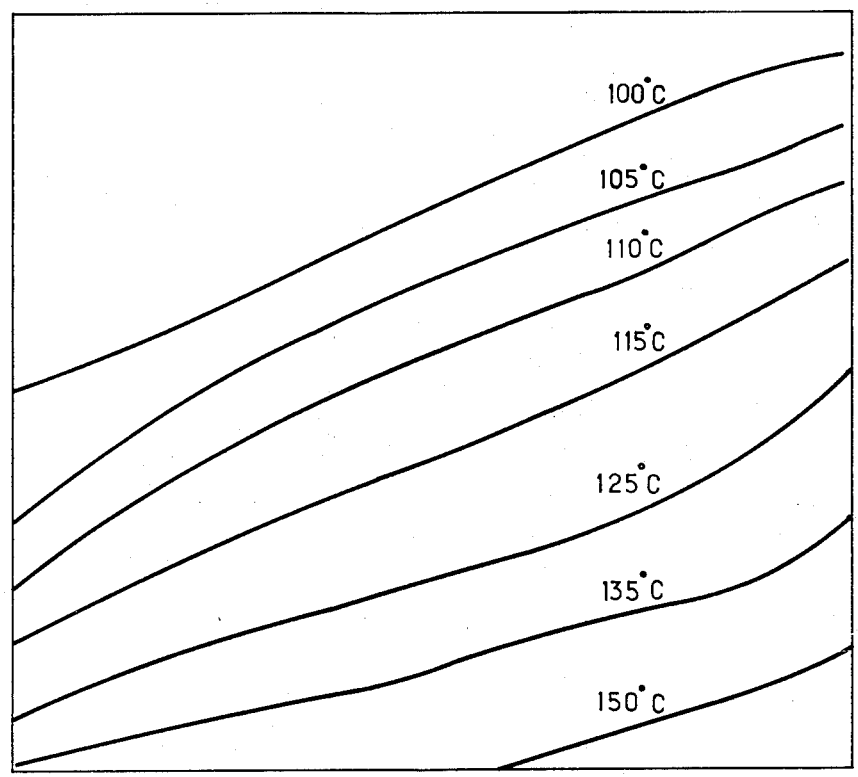
FIG. 2 is a graph illustrating a family of Martens temperature curves.

The variations in the properties of the binder are represented in a diagram as seen in FIG. 1. By interconnecting representative points of the binders of the same characteristics, the diagram of FIG. 2 in which a representation with respect to the Martens temperature is given, is obtained. The family of lines then defines the compositions which still will give the same Martens temperature for any specific binder.

The reactivity of the system can be selected within wide limits, giving a third choice of use. In practical effect, the reactivity determines the speed of condensation between the components, namely the epoxy resins, and the hardeners, by the residual ratio of acid in the hardeners and, possibly, by the ratio of acid which is added to the mixture. The greater the ratio of residual acid, the greater the reactivity of the hardeners of a temperature in the range of about 140–160° C., thus permitting condensation at increasingly short periods of time. However, and this makes this phenomenon so interesting, the average speed of condensation at a somewhat lower temperature does not change, so that drying under vacuum at ranges of temperature up to about 120° C. can be carried out without prematurely increasing the degree of condensation.

A known method of manufacture which is readily carried out with the novolac hardeners used consists in condensing a phenol, or the resorcinol with aqueous formaldehyde in the presence of oxalic acid. It is thus easy to control the ratio of residual acids to a desirable value by decantation and washing of the methylolphenols which are decanted. For the resorcinol condensate, with which washing cannot be used, the quantity of acid utilized in its preparation is reduced. This is made possible by the great affinity of resorcinol for formaldehyde on the one hand and further, and more simply and practically, by preparing the products with a residual ratio of acid which is low and controlled, and then adding oxalic acid, as needed, to the mixture. At the same time, one may also proceed to finish with no acid at all, by neutralizing any residual acid with a mineral base, or an organic base, as known per se.

The effect of the acid in the resin on the action of the hardeners is indicated in Table II below.

The binder of the present invention also has the characteristics that it can be pre-condensed by heating while containing solvent, in order to increase the length of the molecular chains, and to obtain a resin specifically adapted to the use to which it is to be put. Thus, unless binders are to be made for soft, flexible ribbons, impregnation material for molded elements is preferably made of pre-condensed binder, having increased and enhanced qualities of agglomeration, and moldability. An initial binder which is not very reactive can be pre-condensed in a solvent phase and its reactivity is increased after that operation in order to lead it to the desired level by the addition of an acid catalyst. If the compound is to be used as a cover between overlapped conductors, a binder having long molecular chains which do not become volatile in the oven is preferred; such binders have a good agglomerating, that is internally adhesive force. A precondensed material is best used.

The binders of the present invention can provide insulating materials for different uses, such as:

material forming a solution of binders in solvents;
material which is pre-condensed by heat treatment of the solution of the binder;
covering for electrical conductors together with fibrous substances, such as asbestos, glass fibers, synthetic fibers, or mixtures and groupings of such fibers, combined with a varnish or paint-like binder substance which may be pre-condensed or not;
separator elements, formed of a porous base, for example of glass, asbestos, mixtures of these two, or similar materials, and impregnated with a binder in paint or varnish-like form, and pre-condensed or not;
filling materials, which may have fillers therein such as mica slivers or platelets, mica sheets, asbestos sheets or fibers, all impregnated with the varnish-like binder substance which may be pre-condensed or not;
sheets and ribbons which are flexible and soft and are obtained by impregnation of a composite sheet of mica, or agglomerated mica slivers, mica paper, with or without fiber reinforcement or the like, and finally impregnated with a varnish-like binder substance in accordance with the present invention.

Examples will now be given, as illustrations, of the manufacture, and use of the components useful in the present invention.

Manufacture of hardeners of phenol novolac type: a reactor equipped with a cooled condenser is used. 1920 g. of phenol, 1736 g. of formaldehyde (30% aqueous solution) and 38.4 g. of oxalic acid, are dissolved in 228 g. of water. The temperature is increased, under agitation, until about 90° C. The heat is then discontinued and an exothermic condensation will be noted which can be moderated by cooling the reactor. Reflux boiling is maintained during 4 hours. The product then is permitted to decant under heat; the major part of supernatant water is drawn off. The residual water is distilled and condensation of novolac under vacuum is carried out at a temperature to 160° C. during dehydration. The distillate obtained is very close to that of the theoretical. Upon casting and cooling, a vitreous fryable mass is obtained having a liquefaction point in the order of 115 to 125° C.

Manufacture of the resorcinol-formaldehyde condensate: A reflux reactor is used. 2200 grams of technical resorcinol and 1000 g. of formaldehyde (30% aqueous solution) and 4.7 g. of oxalic acid are dissolved in 1100 g. of water. The temperature is increased under agitation. After the resorcinol is dissolved, one obtains a condensation at about 65° C. Heating is discontinued and the exothermic condensation is moderated by cooling of the reactor. Boiling of the reflux is continued during 1 hour. Thereafter, the reactor is set for distillation and dehydration to condense, under vacuum, up to about 160° C. The quantity obtained is very close to the theoretically obtainable amount. By casting and cooling, a vitreous mass is obtained having a liquefaction point at close to 95° C.

Influence of the base of the resin on the catalyst: The novolac-phenol type hardeners, and the resorcinol-formaldehyde condensate reacts with the epoxy-type resins with a speed which is a function of the ratio of acid catalyst, here the oxalic acid, as seen in Table II.

TABLE II

Formula of the binder:
(Epon 827 of equivalent epoxyde)
(DEN 438 of equivalent epoxyde)
(A: Phenol-novolac, 0.9 equivalent hydroxyl B: Resorcinol formol condensate, 0.9 equivalent hydroxyl)
Tape for ground insulation;
Two threads (glass fiber, 25 g./m.²
One mica paper, 180 g./m.²
Binder: 35%

| Nature of hardener | | | Ratio of insoluble products after drying | | |
|---|---|---|---|---|---|
| | | | 4 h* at 120° C. | 2 h at 150° C. | 4 h at 150° C. |
| I | A | Decanted | 2.2% | 24.5% | 83.2% |
| | B | At 1% oxalic acid | | | |
| II | A | Decanted | 2.9% | 6.1% | 86% |
| | B | At 0.2% oxalic acid | | | |
| III | A | Decanted | | | |
| | B | At 1% of acid plus 1% of oxalic acid in the binder varnish | 1.9% | 58.5% | 97% |
| IV | A | Not decanted | | | |
| | B | At 1% oxalic acid | 2.2% | 78% | 99% |

*h=hours.

The percentage of acid represents the quantity of acid which is used with respect to weight of novolac obtained.

From the above table, it will be clear that elimination of a part of the water in the phenol-type novolac, and use of a small amount of oxalic acid to obtain the condensation of resorcinol formol, reduces the proportion of insoluble products after 2 hours at 150° C., so that the polymerization technology of a fluid bath can be used which requires a progression during the heating, whereas use of a higher ratio of acid, or its maintenance in the novolac, or even ultimate addition increases the proportion of the insoluble products after 2 hours at 150° C. This is good for heating of the insulation in a press, and rapid immobilization of the elements. One may also note, furthermore, that the reactivity at 120° C. is low with respect to the reactivity at 150° C., thus permitting in all cases drying under vacuum, and with some heating.

Two possible formulae for binders for insulation tape of the type of tape 11 (FIG. 3) will be given, that is tape which insulates against the iron core, or ground, the binder being dissolved in a suitable solvent which permits impregnation and which, in usual application, is a mixture of an aromatic hydrocarbon and an alcohol.

EXAMPLE 1

| | G. |
|---|---|
| Epon 827 | 134 |
| DEN 438 | 44 |
| Phenol-novolac | 24 |
| Resorcinol-formaldehyde condensate | 40.5 |
| Isopropyl alcohol | 20 |
| Toluol | 40 |

The phenol-type novolac is subjected to decantation after washing in water, and the resorcinol formaldehyde condensate is prepared with 0.2 of oxalic acid. The reactivity of the binder is rather low and will not attain more than 6% of insolubles after 2 hours at 150° C. One obtains, however, complete polymerization in 8 hours at 150° C. The deflection temperature under load (Martens) is about 115° C. The mechanical resistance in bending of the pure, hardened resin is about 14.5 kg./m.$^2$ with a point of 6 mm. Resistance against shock is 52 kg. cm./cm.$^2$.

EXAMPLE 2

| | G. |
|---|---|
| Epon 327 | 178 |
| DEN 438 | 178 |
| Resorcinol-formaldehyde condensate | 108 |
| Isopropyl alcohol | 40 |
| Toluol | 80 |

The condensate is prepared with 0.2% oxalic acid. The reactivity of this binder is much higher at 150° C. without, however, being noticeable at 120° C. The ratio of insoluble products is 3% after 4 hours at 120° C., and will reach 60% after 2 hours at 150° C. It will reach 100% after 5 hours at 150° C. The Martens temperature is 145° C. The mechanical resistance against bending of the pure, hardened resin is 13 kg./cm.$^2$ with a point of 5 mm. Shock resistance is 30 kg. cm./cm.$^2$.

A pre-condensed insulation compound for internal insulation will now be given:

EXAMPLE 3

| | G. |
|---|---|
| Epon 827 | 178 |
| DEN 438 | 178 |
| Phenol-novolac | 65 |
| Resorcinol-formaldehyde | 18 |
| Toluene | 110 |
| Isopropyl alcohol | 55 |
| Oxalic acid | 4.4 |

The phenol-novolac is subjected to decantation following washing with water and the formaldehyde-resorcinol condensate prepared with 0.2 oxalic acid. The epoxy resins are dissolved in a reflux equipped reactor and the hardeners are dissolved in the toluene. The mixture is carried to boiling and maintained at about 125° C., during 8 hours. The insulation liquid (varnish) is cooled and 55 g. of isopropyl alcohol are added, as well as 4.4 g. of oxalic acid. The varnish obtained gives a dry touch if a plate is coated therewith, dried at 80° C. The reactivity of this varnish is measured by the ratio of insoluble products of about 75%, in 2 hours at 150° C. The material of Example 3 is particularly good for impregnation of mica flakes, and similar sheets, and can be used to make corner elements, separators and the like, for example elements 9, or sheets 8 (FIG. 3).

The four examples below describe various insulation materials and their manufacture.

EXAMPLE 4

A soft, flexible ribbon for insulation against ground is made by placing, above each other, glass threads of a density of about 25 g./m.$^2$, a sheet of mica paper of about 180 g./m.$^2$, and a second layer of identical glass threads. The entire assembly is coated by any well-known process with a composition such as described in the above Example 1.

After impregnation, the ribbon is dried to a maximum degree, but without excess, so that it may remain flexible. In practice, 3–4% of volatile materials are obtained; one may come down to 2.5% in ribbons to be used in machine winding or wrapping. The ratio of volatile materials, reduced as much as possible, permits superimposed wrappings of a plurality of layers of ribbons, up to a desired thickness, for example 6 mm. thickness. Swelling under drying will not cause, beyond a mold, folds or cracks in the ribbon which may cause difficulties when the winding is placed under high electrical tension. Such a ribbon may be used, for example, for ribbon 11 (FIG. 3).

EXAMPLE 5

The ribbon as described in Example 4 is made in the same way, except that the composition of Example 2 is used. The ratio of volatile materials in the final ribbon will be in the order of 5–7%, which is permitted for electrical voltages less than 20 kv.

EXAMPLE 6

A moldable separator is made, for insulation between individual conductor units of the windings, and to maintain them in relative positions. A mixed fabric of asbestos glass, or asbestos glass fibers of 260 g./m.$^2$ of average weight is coated with a pre-condensed composition in a solution, as described in Example 3. The coated support is then passed in a heating tunnel at about 140° C., for approximately 5 minutes. A dry, flexible material is obtained, deformable under heat and closely following the curved forms of the sides of the various winding units which, upon further heat treatment, rapidly becomes highly rigid. Such a separator may be used, for example, for divider 8 (FIG. 3).

EXAMPLE 7

The varnish previously described in Example 3 is used to coat an adhere overlapped conductors made of flat copper conductors, each forming an individual winding element. Long molecular chains, from which the varnish is made, rapidly form, in a drying furnace, a coating of high adhesive qualities giving good cohesion to the overlapped winding elements while still permitting eventual deformation of the conductors themselves.

In the two following examples, a combination of insulation for the stator of an electric rotating machine will be described. First, a high-tension turbo alternator designed for water, or hydrogen cooling, and then a heavy synchronous motor.

EXAMPLE 8

A winding unit, as described in connection with FIG. 3 is prepared. The elementary overlapped conductors, separated by separators 8 and coated on the outside with mastic 10, and protected with corners 9 is shaped into the desired winding form, while being adhered together in a heated press, during 45 minutes and at 160° C. Thereafter, a ribbon 11 as previously described in connection with Example 4, and of about 3 cm. width is wrapped over the semi-finished coil unit. A sufficient number of layers is wrapped around to obtain the desired thickness, for example 5.5 mm. for 24 kv. nominal tension. The entire winding unit is dried under vacuum and at 120° C. for several hours.

After this operation, the winding unit is placed into a press in order to give it the exact geometric dimensions required. Finally, the insulation is polymerized by placing the winding unit in a bath of hot fluid, under pressure, at 160° C., pressure of about 7 kg./cm.$^2$. The fluid may be in accordance with Examples 1 or 3. The insulated wires will have all the mechanical characteristics which are required, and the necessary elasticity in spite of large dimensions. Dielectric losses are very low: at 155° C., the product $\epsilon \tan \delta$ is not over 0.2. This type of insulation permits power output of several hundred MVA at voltages in excess of 25 kv.

EXAMPLE 9

Insulation for stator windings for high-power synchronous motors: The electrical conductors are flat copper bars, covered with glass fibers and the composition of Example 3. The fibers themselves are wrapped spirally. In order to adhere them together, a glass thread of 50 g./m.$^2$ is coated with the composition of Example 3, and then wound, spirally, over the conductor. The straight parts are adhered in a press, the various windings being separated by an anti-adhesive film. The winding units themselves are insulated from each other by two layers of a semi wrapping of tape of the Example 5 above, and then insulation with respect to ground, that is the magnetic circuit, is carried out by taping to the same ribbon, a number of layers sufficiently great to obtain a thickness of, for example, 2.5 mm. for 12 kv. of nominal tension. The free ends of the windings are insulated by a flexible, non-polymerized ribbon, in a known manner. After drying under vacuum, and under heating in the conditions previously described, the coils are cured in a press, or molding fixture, at 160° C. during 3 hours. A post-heat-curing drying step may be carried out, for example also at a temperature of 160° C.

The coils thus made have all the necessary features for operating in class F under high tension, will have the required mechanical and temperature resistances and an electrical loss measured by the product of $\epsilon \tan \delta$ of less than 0.2 at 155° C.

It has been found that after aging at 165° C. during a thousand hours, the losses were still low. The factor $\epsilon \tan \delta$ reached a value less than 0.5 at 160° C. at the end of 500 hours and, thereafter, remained constant at that value.

We claim:

1. Electrical insulation composition comprising a mixture of at least three of the following four components
   component 1 epoxy resin of bisphenol A having an epoxy equivalent between about 174 and about 195;
   component 2 epoxy novolac resin, other than component 1, having an epoxy equivalent between about 175 and about 182;
   component 3 hardener of resorcinol-formaldehyde resin obtained by reaction of 2 mols of resorcinol and 1 mol of formaldehyde, with an organic acid catalyst;
   component 4, hardener other than component 3, of phenol novolac resin, prepared with an organic acid catalyst and containing 5 to 8 methylene linkages;
   said hardeners being used with respect to said epoxy resins in proportion of hydroxide/oxyrane between about 0.5 and about 1.3.

2. Composition according to claim 1, wherein said hardeners are used in a hydroxyl-oxyrane proportion with respect to the resins of about 0.9.

3. Composition according to claim 1, wherein the organic acid catalyst for the polymerization reaction between the resin and the hardener is a phenol-formaldehyde condensate; said catalyst being present in the insulation compound in amounts of between about 0.1 and about 6%, by weight, of the hardeners.

4. Composition according to claim 1, comprising a mixture of all four said components.

5. Composition according to claim 1, including a solvent.

6. Composition according to claim 5, wherein said solvent comprises an aromatic hydrocarbon or an alcohol.

7. Composition according to claim 1, in combination with a sheet, ribbon, tape or other flat material impregnated therewith.

8. The impregnated composition of claim 7, wherein said sheet, ribbon, or tape-like material comprises mica flakes, asbestos, glass fibers, or asbestos-glass fibers.

9. The impregnated composition of claim 7 forming electrical insulation for an electrical conductor in a structure, said composition surrounding the electrical conductor and separating said conductor from the surrounding structure.

References Cited
UNITED STATES PATENTS

| | | | |
|---|---|---|---|
| 3,367,990 | 2/1968 | Bremmer | 260—831 |
| 3,716,598 | 2/1973 | Markovitz | 260—831 |
| 3,051,681 | 8/1962 | Partansky | 260—831 |
| 3,200,172 | 8/1965 | Renner | 260—831 |
| 3,264,369 | 8/1966 | Ephraim | 260—831 |
| 3,383,433 | 5/1968 | Salensky | 260—831 |
| 3,493,630 | 2/1970 | Salensky | 260—831 |
| 3,563,850 | 2/1971 | Stackhouse | 260—831 |
| 3,649,572 | 3/1972 | Hairston | 260—831 |

OTHER REFERENCES

Handbook of Epoxy Resins, Henry Lee and Kris Neville, McGraw-Hill, 1967, New York, pp. 2–10.

PAUL LIEBERMAN, Primary Examiner

U.S. Cl. X.R.

117—124 E, 126 AB, 132 BE; 161—185, 186; 260—37 EP, 38, 830 TW